US012680455B2

(12) United States Patent
Rausch et al.

(10) Patent No.: US 12,680,455 B2
(45) **Date of Patent: *Jul. 14, 2026**

(54) TURBINE ENGINE WITH A BLADE

(71) Applicant: General Electric Company, Schenectady, NY (US)

(72) Inventors: Jonathan Michael Rausch, West Chester, OH (US); Zachary Daniel Webster, Cincinnati, OH (US); Kevin Robert Feldmann, Mason, OH (US); Andrew David Perry, Cincinnati, OH (US); Kirk Douglas Gallier, Liberty Township, OH (US); Daniel Endecott Osgood, Loveland, OH (US)

(73) Assignee: General Electric Company, Evendale, OH (US)

( * ) Notice: Subject to any disclaimer, the term of this patent is extended or adjusted under 35 U.S.C. 154(b) by 57 days.

This patent is subject to a terminal disclaimer.

(21) Appl. No.: 18/440,316

(22) Filed: Feb. 13, 2024

(65) Prior Publication Data

US 2025/0027417 A1 Jan. 23, 2025

Related U.S. Application Data

(63) Continuation-in-part of application No. 17/836,049, filed on Jun. 9, 2022, now Pat. No. 11,898,460, and (Continued)

(51) Int. Cl.

| | |
|---|---|
| ***F01D 5/18*** | (2006.01) |
| ***F01D 5/14*** | (2006.01) |
| ***F01D 9/04*** | (2006.01) |

(52) U.S. Cl.

CPC ............. *F01D 5/186* (2013.01); *F01D 5/147* (2013.01); *F01D 9/041* (2013.01); *F05D 2240/307* (2013.01); *F05D 2270/303* (2013.01)

(58) Field of Classification Search

CPC .......... F01D 5/186; F01D 5/147; F01D 9/041; F01D 5/20; F01D 5/187; F05D 2240/307; F05D 2270/303; F05D 2260/202

See application file for complete search history.

(56) References Cited

U.S. PATENT DOCUMENTS 4,153,386 A 5/1979 Leogrande et al.
4,601,638 A 7/1986 Hill et al.
(Continued)

OTHER PUBLICATIONS

ICAO Engine Exhaust Emissions Data Sheet, Subsonic Engines, ID GEnx-0B76A/P2, one page, prepared Jan. 22, 2021.
(Continued)

*Primary Examiner* — Courtney D Heinle
*Assistant Examiner* — Andrew Thanh Bui
(74) *Attorney, Agent, or Firm* — Hanley, Flight & Zimmerman, LLC

(57) ABSTRACT

A turbine engine includes an engine core extending along an engine centerline and includes a compressor section, a combustor, and a turbine section in serial flow arrangement. A temperature sensor is provided within the engine and configured to detect a gas temperature within the engine core. A set of blades is circumferentially arranged in the turbine section. A blade in the set of blades includes an outer wall bounding an interior, a cooling conduit within the interior, and a plurality of film holes fluidly coupled to the cooling conduit.

20 Claims, 6 Drawing Sheets

Related U.S. Application Data a continuation-in-part of application No. 18/354,774, filed on Jul. 19, 2023, now Pat. No. 12,398,646, which is a continuation-in-part of application No. 17/836,049, filed on Jun. 9, 2022, now Pat. No. 11,898,460.

(56) References Cited

U.S. PATENT DOCUMENTS

| | | | | |
|---|---|---|---|---|
| 5,387,085 | A | 2/1995 | Thomas et al. | |
| 5,624,231 | A | 4/1997 | Ohtomo et al. | |
| 6,164,914 | A | 12/2000 | Correia et al. | |
| 6,514,037 | B1 | 2/2003 | Danowski et al. | |
| 7,249,934 | B2 | 7/2007 | Palmer et al. | |
| 7,712,316 | B2 | 5/2010 | Spangler | |
| 7,997,866 | B2 | 8/2011 | Naik et al. | |
| 8,079,812 | B2 | 12/2011 | Okita | |
| 8,092,176 | B2 | 1/2012 | Liang | |
| 8,092,179 | B2 | 1/2012 | Paauwe et al. | |
| 8,109,726 | B2 * | 2/2012 | Liang | F01D 5/187 416/97 R |
| 8,328,517 | B2 | 12/2012 | Liang | |
| 9,103,217 | B2 | 8/2015 | Giglio et al. | |
| 9,188,012 | B2 | 11/2015 | Lacy et al. | |
| 9,228,440 | B2 | 1/2016 | Kollati et al. | |
| 9,322,279 | B2 | 4/2016 | Spangler et al. | |
| 9,494,043 | B1 | 11/2016 | Lee et al. | |
| 9,506,351 | B2 * | 11/2016 | Bubnick | F01D 5/186 |
| 9,605,545 | B2 | 3/2017 | Grohens et al. | |
| 9,957,811 | B2 | 5/2018 | Hucker et al. | |
| 10,215,030 | B2 | 2/2019 | Xu | |
| 10,472,972 | B2 | 11/2019 | Bunker et al. | |
| 10,626,730 | B2 | 4/2020 | Auxier et al. | |
| 10,767,490 | B2 | 9/2020 | Clum et al. | |
| 10,822,958 | B2 | 11/2020 | Wang et al. | |
| 11,053,809 | B2 * | 7/2021 | Osgood | F01D 9/065 |
| 11,898,460 | B2 * | 2/2024 | Rausch | F01D 5/186 |
| 2005/0232768 | A1 | 10/2005 | Heeg et al. | |
| 2006/0073015 | A1 | 4/2006 | Liang | |
| 2006/0104807 | A1 | 5/2006 | Lee | |
| 2016/0003052 | A1 | 1/2016 | Shi et al. | |
| 2018/0320530 | A1 | 11/2018 | Feldmann et al. | |
| 2020/0190990 | A1 | 6/2020 | Hohenstein | |
| 2022/0098986 | A1 * | 3/2022 | Kim | F01D 5/186 |
| 2023/0399954 | A1 | 12/2023 | Rausch et al. | |
| 2025/0027417 | A1 * | 1/2025 | Rausch | F01D 5/187 |

OTHER PUBLICATIONS

U.S. Department of Transporation, Federal Aviation Administration, TCDS No. E00077NE, Rev. 17, 22 pages, Dec. 21, 2020.

* cited by examiner

TURBINE ENGINE WITH A BLADE

CROSS-REFERENCE TO RELATED APPLICATION(S)

This application is a continuation-in-part of U.S. application Ser. No. 17/836,049, filed Jun. 9, 2022, and this application is a continuation U.S. application Ser. No. 18/354,774, now U.S. Pat. No. 11,898,460, issued Feb. 13, 2024, each of which is incorporated herein by reference in its entirety.

TECHNICAL FIELD

The present subject matter relates generally to a blade for a turbine engine, and more specifically to a blade with cooling hole and geometric features.

BACKGROUND

A gas turbine engine typically includes a turbomachine, with a fan in some implementations. The turbomachine generally includes a compressor, combustor, and turbine in serial flow arrangement. The compressor compresses air which is channeled to the combustor where it is mixed with fuel. The mixture is then ignited for generating hot combustion gases. The combustion gases are channeled to the turbine, which extracts energy from the combustion gases for powering the compressor and fan, if used, as well as for producing useful work to propel an aircraft in flight or to power a load, such as an electrical generator.

During operation of the gas turbine engine, various systems can generate a relatively large amount of heat. For example, a substantial amount of heat can be generated during operation of the thrust generating systems, lubrication systems, electric motors and/or generators, hydraulic systems or other systems. Accordingly, cooling mechanisms for the engine components therein is advantageous.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
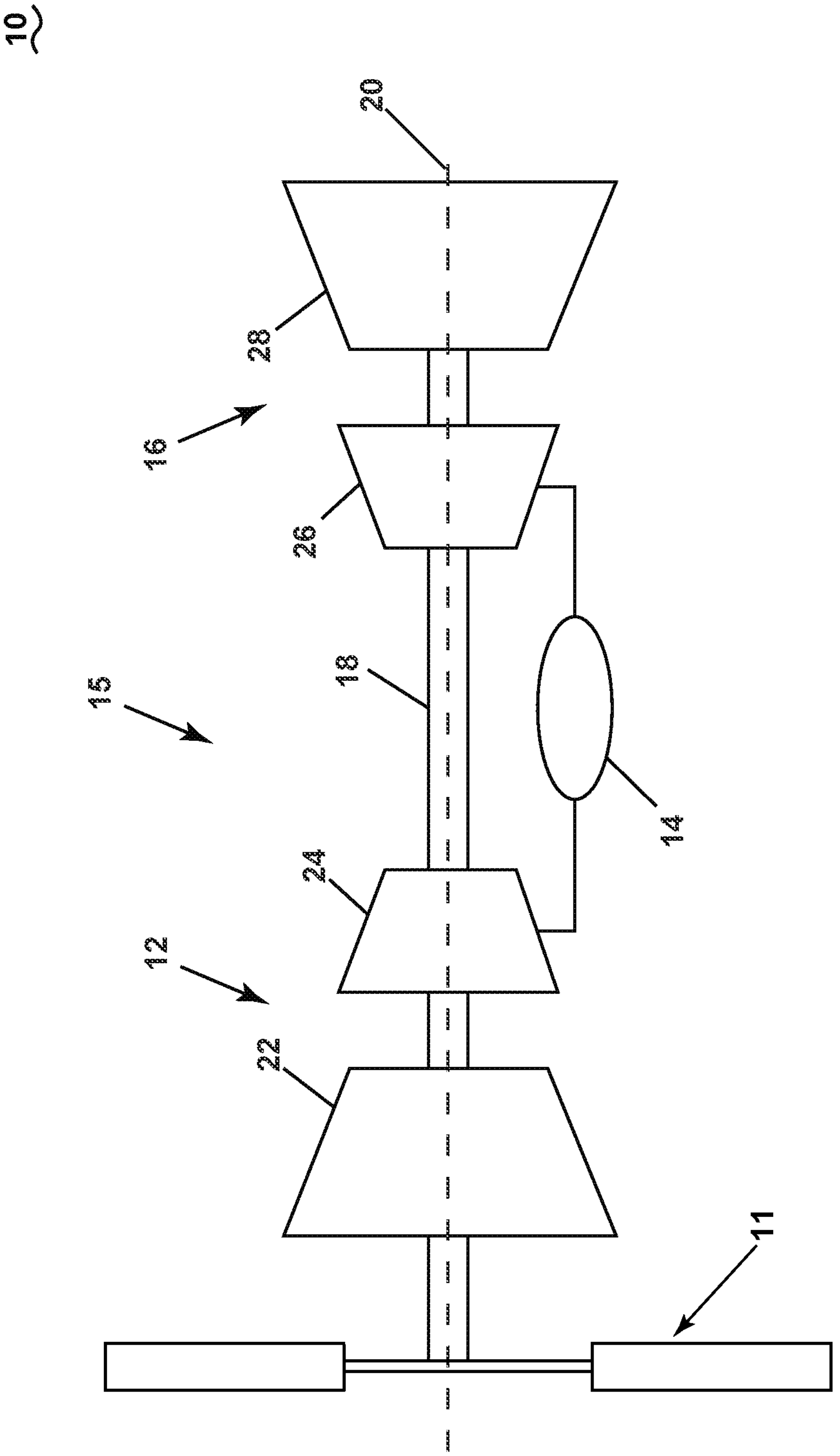
FIG. 1 is a schematic cross-sectional view of a gas turbine engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Aspects of the disclosure generally relate to turbine engine airfoils, including cooled turbine engine blades. Traditional blades often include film cooling over portions of the blade surface, where tip cooling arrangements are generally separated from radially-inward cooling arrangements due to design constraints. Aspects of the disclosure provide for a blade with an integrated cooling design for both tip regions and radially inner regions, providing for improved cooling performance at higher-temperature operations. Aspects of the disclosure also provide for a blade with a generally smooth or flat exterior surface, providing improved aerodynamic performance while allowing for desired cooling effectiveness in high-temperature environments.

The word “exemplary” is used herein to mean “serving as an example, instance, or illustration.” Any implementation described herein as “exemplary” is not necessarily to be construed as preferred or advantageous over other implementations. Additionally, unless specifically identified otherwise, all embodiments described herein should be considered exemplary.

As may be used herein, the terms “first,” “second,” and “third” can be used interchangeably to distinguish one component from another and are not intended to signify location or importance of the individual components.

The terms “forward” and “aft” as may be used herein refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms “upstream” and “downstream” refer to the relative direction with respect to a flow in a pathway. For example, with respect to a fluid flow, “upstream” refers to the direction from which the fluid flows, and “downstream” refers to the direction to which the fluid flows.

The term “fluid” can be a gas or a liquid. The terms “fluid communication” or “fluid coupling” means that a fluid is capable of making the connection between the areas specified.

The singular forms “a”, “an”, and “the” include plural references unless the context clearly dictates otherwise.

As used herein, an “additively manufactured” component will refer to a component formed by an additive manufacturing (AM) process, wherein the component is built layer-by-layer by successive deposition of material. AM is an appropriate name to describe the technologies that build 3D objects by adding layer-upon-layer of material, whether the material is plastic, ceramic, or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term “additive manufacturing” encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. It is also contemplated that a process utilized could include printing a negative of the part, either by a refractory metal, ceramic, or printing a plastic, and then using that negative to cast the component.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As used herein, "flow field" refers to a distribution of at least one of a fluid density or fluid velocity in a given spatial region.

As used herein, a "stage" of either the compressor or turbine is a pair of adjacent set of blades and set of vanes, with both sets of the blades and vanes circumferentially arranged about an engine centerline. The blades rotate relative to the engine centerline and, in one example, are mounted to a rotating structure, such as a disk, to affect the rotation. A pair of circumferentially-adjacent vanes in the set of vanes are referred to as a nozzle. In one implementation, the vanes are stationary and mounted to a casing surrounding the set of blades. In another implementation with a counter-rotating engine, the vanes are mounted to a rotating drum surrounding the set of blades. The rotation of the blades creates a flow of air through the vanes/nozzles.

As used herein, a "number of blades" (denoted "NB") is the number of blades in a stage within either the combustor or turbine of a turbine engine of an aircraft.

As used herein, a "number of nozzles" (denoted "NN") is the number of nozzles in a stage. Put another way, the number of nozzles NN in a stage will be half the number of vanes in that stage.

As used herein, "exhaust gas temperature" (denoted "EGT") refers to a redline, or maximum permitted takeoff temperature documented in a Federal Aviation Administration ("FAA")-type certificate data sheet. For example, in certain exemplary embodiments, "exhaust gas temperature" or "EGT" refers to a maximum permitted takeoff temperature of an airflow after a first stage stator downstream of an HP turbine of an engine that the engine is rated to withstand. In embodiments wherein the engine is configured as a three-spool engine, "exhaust gas temperature" or "EGT" refers to a maximum permitted takeoff temperature of an airflow after the first stator downstream of the last stage of rotor blades of an intermediate speed turbine. The term "exhaust gas temperature" or "EGT" is sometimes also referred to as a redline exhaust gas temperature, an indicated turbine exhaust gas temperature, or an indicated turbine temperature.

As used herein, "tip radius" (denoted "TR") is the distance measured from the engine centerline to a tip of the blades when the turbine engine is off under standard day conditions, i.e. 15° C. at mean sea level altitude and 101.3 kPa atmospheric pressure, as is known in the art. Tip radius TR as used herein is also known in the art as a "cold tip radius."

As used herein, a "percent span," or "percent of span," e.g. 50% span, 80% span, 100% of span, or the like, refers to a location along a blade expressed in terms of a percentage of an overall span-wise length of a blade, as measured from a tip to a root. For example, "10% span" refers to a location along the blade that is spaced from the tip by 10% of the overall span-wise length of that blade. Put another way, "10% span" refers to a location along the blade that is spaced from the root by 90% of the overall span-wise length.

As used herein, "radial" or "radially" refers to a span-wise direction defined between a blade root and a blade tip. In some implementations, the span-wise direction is non-orthogonal to an engine centerline. In some implementations, the span-wise direction is orthogonal to an engine centerline.

As used herein, "blade parameter" (denoted "BP") is a value describing the smoothness of the blade along a pressure side of the blade. The blade parameter BP is a ratio between a blade surface length, or surface length (denoted "$L_{max}$") and a radial length (denoted "R") between two points lying on the blade surface. The radial length R is a straight-line/radial distance measured radially along the pressure-side surface between two locations that share a common chord-wise position. The surface length $L_{max}$ measures the length of a pressure-side surface between the same two locations as R. Put another way, R represents a distance between two points on a flat blade surface, and $L_{max}$ is a contour or length portion of the blade surface between the same two points taken over the blade surface, the length measured to include indents or protrusions on the blade surface, and excluding any cooling holes, slots, or other apertures that extend through the blade surface. When the ratio $L_{max}/R$ is equal to 1, the blade is smooth or has a flat surface. When the ratio $L_{max}/R$ is greater than 1, an indent or a protrusion exists on the blade, such as a shelf on the blade surface. The blade parameter BP describes the flatness of the blade between the two points.

As used herein, Blade Tip Durability Factor (denoted "BTDF") is a value describing a relationship between the number of blades NB, number of nozzles NN, exhaust gas temperature EGT, tip radius TR, and blade parameter BP.

In certain exemplary embodiments of the present disclosure, a gas turbine engine defining a centerline and a circumferential direction is provided. The gas turbine engine can generally include a rotor assembly and a stator assembly. The rotor assembly and the stator assembly can collectively define a substantially annular flow path relative to the centerline of the gas turbine engine. The rotor assembly can include a set of blades. The set of blades extend from a disk and can be distributed circumferentially about the engine centerline. It is further contemplated that the set of blades can be any number of blades mounted to the disk. The stator assembly includes a set of vanes. The set of vanes extend between inner and outer bands and are distributed circumferentially about the centerline. The set of vanes also defines a set of nozzles. It is further contemplated that the set of vanes includes a single pair of vanes defining a single nozzle. Rotation of the disk causes the set of blades to produce a fluid flow through the set of nozzles.

The number of blades NB and the number of nozzles NN for a stage are both contributors to controlling a flow field across each blade and through the nozzles. The tip radius TR sets a tip clearance value along with a tip rotational speed.

For instance, material properties of the blade such as shear, thermal expansion, or the like can affect the tip clearance value at high rotational speeds. In this manner, the number of blades NB, number of nozzles NN, and tip radius TR are integral to the need for certain specific cooling on the blade during operation.

In addition, it can be appreciated that multiple engine operating factors have an effect on blade cooling and aerodynamic performance at a given location within the engine. For instance, upstream nozzle configurations establish the incoming airflow to the blades at a given stage. Nozzles can produce varying-temperature wakes, such as a nozzle exit "hot-cold-hot" wake, that a downstream blade then rotates through during operation. Such nozzle-exit wakes or flow features define incoming flow boundary conditions onto the downstream blade, and also determine a primary condition for setting the blade thermal environment that leads to a blade cooling performance condition.

Another factor to be considered is that the number of blades NB on the disk sets a limit on an overall chord-wise width of each blade, including a chord-wise width of the blade tip. For example, a low number of blades per disk provides for longer chord-wise tip widths, and a high number of blades per disk leads to shorter chord-wise tip widths. It can be appreciated that wider blade tips can require more cooling holes, cooling rows, or larger spacing between a fixed number of cooling holes, to achieve a given cooling performance over the wider surface.

Still another factor to be considered is that the tip radius TR of the blade impacts the clearance between the rotating blade and the stationary outer wall adjacent the tip. A larger clearance will allow for more hot flow to go over the tip of the blade during operation, and a smaller clearance will allow less hot flow to go over the tip. It can be appreciated that a larger tip clearance, with more hot flow over the tip, warrants a higher amount of cooling needed for the blade. The blade tip clearance value is used to determine a specific selection of tip hole placement, spacing, patterning, or the like.

The standard practice for solving the nozzle-exit wake problem has been to design cooling hole outlet patterns for the turbine engine using a baseline condition, e.g. "flight idle," then select a cooling hole layout for the blade at its particular location within the engine, and then verify whether the blade will operate in an acceptable manner across a flight envelope, including from a cooling-performance perspective and an aerodynamic-performance perspective. Such cooling hole layouts are often designed with respect to a baseline blade geometric profile, which can include a baseline pressure-side smoothness.

The inventors' practice has proceeded in the manner of designing a turbine engine with a given number of blades and nozzles, modifying a cooling hole layout on the blade in a particular engine stage, testing the engine with the cooling hole layout for meeting cooling requirements, redesigning the turbine engine (number of stages, blades, nozzles, or the like), if needed, to meet cooling requirements, then checking the cooling performance again. This process can continue for long periods of time until a workable blade design is identified. The above-described iterative process is then repeated for the design of several different types of turbine engines in which the blade will be utilized, such as those shown in the following FIGS. 1 and 2. In other words, an engine can meet the cooling performance requirements but not another necessary benchmark. Examples of the turbine engine and cooling hole layouts developed by the inventors follows.

Referring now to the drawings, FIG. 1 is a schematic view of a turbine engine 10. As a non-limiting example, the turbine engine 10 can be used within an aircraft. The turbine engine 10 can include an engine core 15 including, at least, a compressor section 12, a combustor 14, and a turbine section 16. A fan 11 is also provided in the engine 10 for providing inlet air to the compressor section 12. A drive shaft 18 rotationally couples the fan 11, compressor section 12, and turbine section 16, such that rotation of one affects the rotation of the others, and defines a rotational axis or centerline 20 for the turbine engine 10.

The compressor section 12 includes a low-pressure (LP) compressor 22 and a high-pressure (HP) compressor 24 serially fluidly coupled to one another. The turbine section 16 includes an HP turbine 26 and a LP turbine 28 serially fluidly coupled to one another. The drive shaft 18 operatively couples the LP compressor 22, the HP compressor 24, the HP turbine 26 and the LP turbine 28 together. In some implementations, the drive shaft 18 includes an LP drive shaft (not illustrated) and an HP drive shaft (not illustrated), where the LP drive shaft couples the LP compressor 22 to the LP turbine 28, and the HP drive shaft couples the HP compressor 24 to the HP turbine 26. An LP spool be defined as the combination of the LP compressor 22, the LP turbine 28, and the LP drive shaft such that the rotation of the LP turbine 28 applies a driving force to the LP drive shaft, which in turn rotates the LP compressor 22. An HP spool can be defined as the combination of the HP compressor 24, the HP turbine 26, and the HP drive shaft such that the rotation of the HP turbine 26 applies a driving force to the HP drive shaft which in turn rotates the HP compressor 24.

While not illustrated, it will be appreciated that the turbine engine 10 can include other components, such as, but not limited to a gearbox. As a non-limiting example, the gearbox can be located at any suitable position within the turbine engine such that it connects one rotating portion to another. As a non-limiting example, the gearbox can connect the fan 11 to the drive shaft 18. The gearbox can allow the fan 11 to run at a different speed than the remainder of the turbine engine 10.

The compressor section 12 includes a plurality of axially spaced stages. Each stage includes a set of circumferentially-spaced rotating blades and a set of circumferentially-spaced stationary vanes. In one configuration, the compressor blades for a stage of the compressor section 12 is mounted to a disk, which is mounted to the drive shaft 18. Each set of blades for a given stage can have its own disk. In one implementation, the vanes of the compressor section 12 is mounted to a casing which extends circumferentially about the turbine engine 10. In a counter-rotating turbine engine, the vanes are mounted to a drum, which is similar to the casing, except the drum rotates in a direction opposite the blades, whereas the casing is stationary. It will be appreciated that the representation of the compressor section 12 is merely schematic and that there can be any number of stages. Further, it is contemplated that there can be any other number of components within the compressor section 12.

Similar to the compressor section 12, the turbine section 16 includes a plurality of axially spaced stages, with each stage having a set of circumferentially-spaced, rotating blades and a set of circumferentially-spaced, stationary vanes. In one configuration, the turbine blades for a stage of the turbine section 16 are mounted to a disk which is mounted to the drive shaft 18. Each set of blades for a given stage can have its own disk. In one implementation, the vanes of the turbine section are mounted to the casing in a circumferential manner. In a counter-rotating turbine engine, the vanes can be mounted to a drum, which is similar to the casing, except the drum rotates in a direction opposite the blades, whereas the casing is stationary. It is noted that there can be any number of blades, vanes and turbine stages as the illustrated turbine section is merely a schematic representation. Further, it is contemplated that there can be any other number of components within the turbine section 16.

The combustor 14 is provided serially between the compressor section 12 and the turbine section 16. The combustor 14 is fluidly coupled to at least a portion of the compressor section 12 and the turbine section 16 such that the combustor 14 at least partially fluidly couples the compressor section 12 to the turbine section 16. As a non-limiting example, the combustor 14 is fluidly coupled to the HP compressor 24 at an upstream end of the combustor 14 and to the HP turbine 26 at a downstream end of the combustor 14.

During operation of the turbine engine 10, ambient or atmospheric air is drawn into the compressor section 12 via the fan 11 upstream of the compressor section 12, where the air is compressed defining a pressurized air. The pressurized air then flows into the combustor 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section (not illustrated) downstream of the turbine section 16. The driving of the LP turbine 28 drives the LP spool to rotate the fan 11 and the LP compressor 22. The pressurized airflow and the combustion gases together define a working airflow that flows through the fan 11, compressor section 12, combustor 14, and turbine section 16 of the turbine engine 10.

Figure 2:
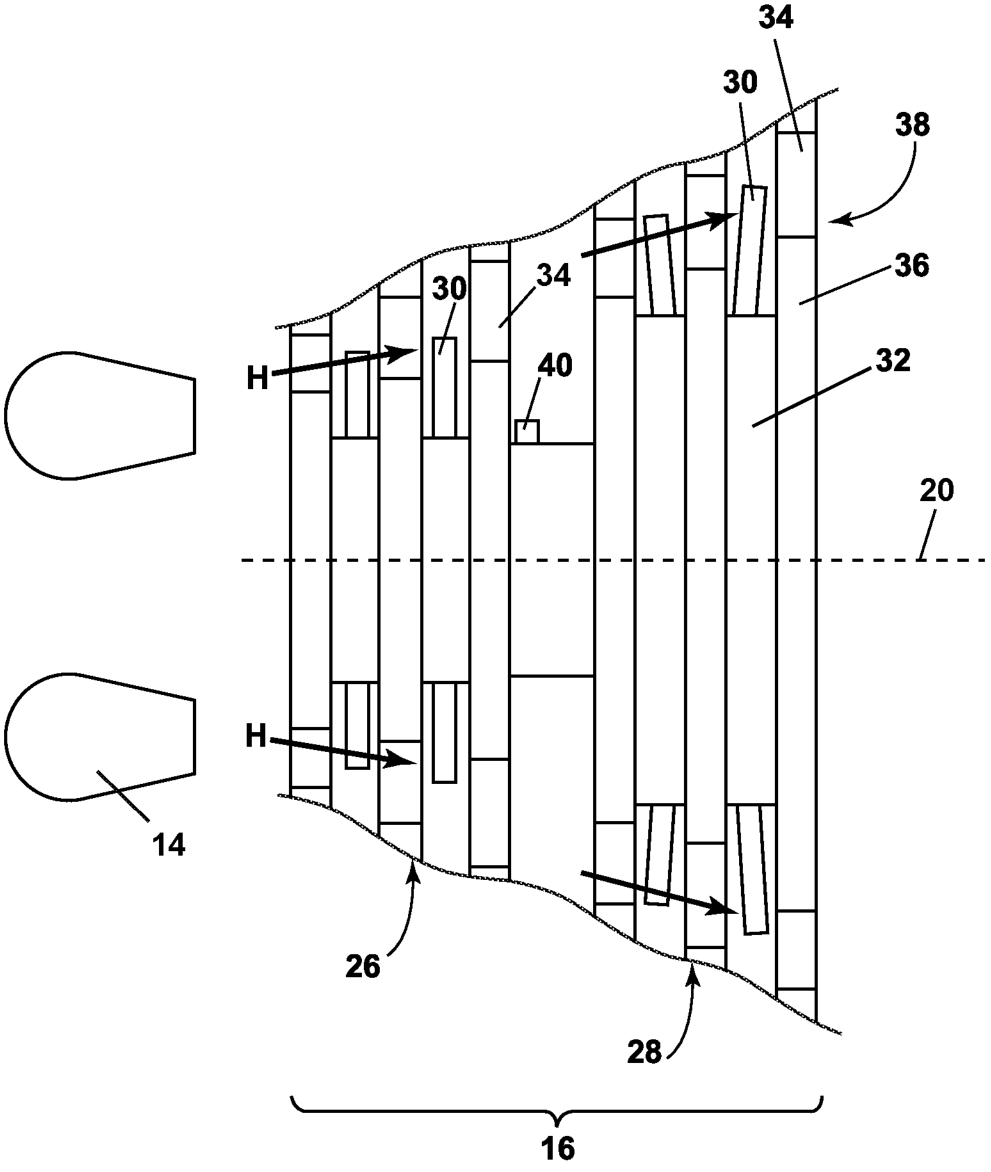
FIG. 2 is a schematic cross-sectional view of a turbine section of the gas turbine engine of FIG. 1 in accordance with an exemplary embodiment of the present disclosure.

Turning to FIG. 2, a portion of the turbine section 16 is schematically illustrated. The turbine section 16 includes blades 30 mounted to corresponding disks 32. Any number of individual blades 30 can be mounted to each disk 32. In some implementations, the blades 30 extend from the disk 32 orthogonally to the engine centerline 20. In some implementations, the blades 30 extend from the disk 23 non-orthogonally to the engine centerline 20.

Stationary vanes 34 are mounted to a stator ring 36 located axially downstream from each of the disks 32. A nozzle 38 is defined by circumferentially-adjacent pairs of vanes 34. Any number of nozzles 38 can be provided on the stator ring 36. In one exemplary configuration, each disk 32 includes at least 60 blades 30, including between 60-70 blades 30, or up to 64 blades 30, in non-limiting examples. Each stator ring 36 includes at least 38 nozzles 38, including between 38-50 nozzles 38, or up to 42 nozzles 38, in non-limiting examples.

During operation of the engine 10, a flow of hot gas (denoted "H") exits the combustor 14 and enters the turbine section 16. Various temperature sensors can be provided for measuring a hot gas temperature at locations within the engine 10. In one example, a temperature sensor in the form of an EGT sensor 40 is located between the LP turbine 28 and the HP turbine 26. The EGT sensor 40 senses, detects, or measures a temperature of the flow of hot gas H at the indicated location. Multiple EGT sensors 40 can be provided.

For engine performance, the design of the geometry of an individual blade 30 is a function of the temperature of the flow of hot gas H at or near the location of the blade 30, such as within two stages of the blade 30. By way of non-limiting example, an exemplary blade 30 in FIG. 2 has a geometric profile based on the temperature of the flow of hot gas H as measured by the EGT sensor 40.

Figure 3:
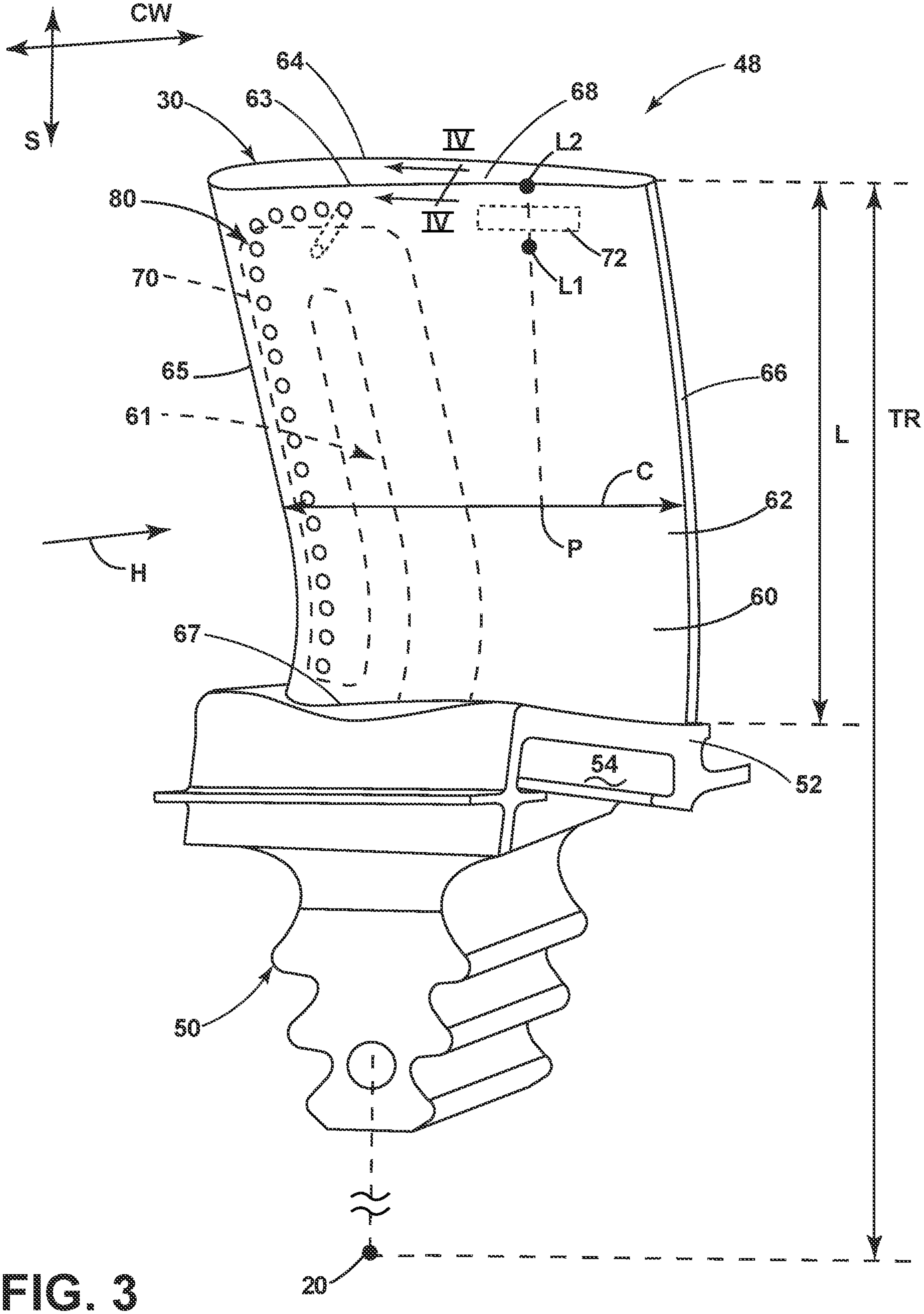
FIG. 3 is a perspective view of a turbine blade suitable for the turbine engine from FIG. 1 in accordance with various aspects described herein.

FIG. 3 is a perspective view of an exemplary blade assembly 48 that can be utilized in the turbine engine 10 (FIG. 1). The blade assembly 48 includes the blade 30 and a dovetail 50. A platform 52 provides a mounting surface for the blade 30.

Materials used to form the blade assembly 48 can include, but are not limited to, steel, refractory metals such as titanium, or superalloys based on nickel, cobalt, or iron, ceramic matrix composites, or combinations thereof. The blade assembly 48 can be formed by a variety of methods, including additive manufacturing, casting, electroforming, or direct metal laser melting, in non-limiting examples.

When multiple blades 30 are circumferentially arranged in side-by-side relationship, the platform 52 bounds the flow of hot gas H and forms part of an annulus through which the hot gas H flows. The dovetail 50 is configured to mount to the disk 32 (FIG. 2) of the engine 10. At least one inlet passage 54 extends through the dovetail 50 and the platform 52 to provide internal fluid communication with the blade 30.

The blade 30 includes an outer wall 60 bounding an interior 61 and having an exterior surface 62. The outer wall 60 defines a concave-shaped pressure side 63 and a convex-shaped suction side 64 (hidden from view) which are joined together to define an airfoil cross-sectional shape of the blade 30. The outer wall 60 also extends between a leading edge 65 and a trailing edge 66 to define a chord-wise direction (denoted "CW").

The outer wall 60 forms a root 67 where the blade 30 meets the platform 52. The blade 30 extends radially outward from the root 67 to a tip 68 to define a span-wise direction (S). In some examples the span-wise direction S is non-orthogonal to the engine centerline 20 (FIG. 2), such as for blades 30 having a radial curvature between the root 67 and tip 68.

A span-wise length (denoted "L") is indicated for the blade 30 between the tip 68 and the root 67 as shown. In addition, a tip radius (denoted "TR") is indicated between the tip 68 and a center of rotation for the blade 30, as indicated with truncated dashed line from the engine centerline 20.

The interior 61 of the blade 30 includes at least one cooling supply conduit or cooling conduit 70, illustrated in dashed line. The cooling conduit 70 is fluidly coupled with the inlet passage 54. Multiple cooling supply conduits 70 can be provided in the interior 61. Additionally or alternatively, a single cooling conduit 70 can be provided, such as a serpentine cooling conduit 70 extending throughout the interior 61.

At least one cooling hole is located along the outer wall 60. In the illustrated example, a plurality of film cooling holes 80 (or "film holes 80") are shown in the outer wall 60 and fluidly coupled to the at least one cooling conduit 70.

Some exemplary first and second locations (denoted "L1" and "L2," respectively) are indicated on the outer wall 60. In the example shown, the first location L1 is at 10% span, i.e. 10% of the span-wise length L, and the second location L2 is at 0% of the span-wise length L. Put another way, the second location L2 is at the tip 68.

In addition, an exemplary chord line (denoted "C") is indicated along the blade 30 between the leading edge 65 and trailing edge 66. A chord-wise position (denoted "P") is also indicated for the first location L1 and the second location L2. The first and second locations L1, L2 share a common chord-wise position P between the leading edge 65 and trailing edge 66. FIG. 3 shows the chord line C and span-wise length L as projected onto the plane of the paper. The chord-wise position P, the dashed line extending upwards from P, and the first and second locations L1, L2 reside in this plane.

Figure 4:
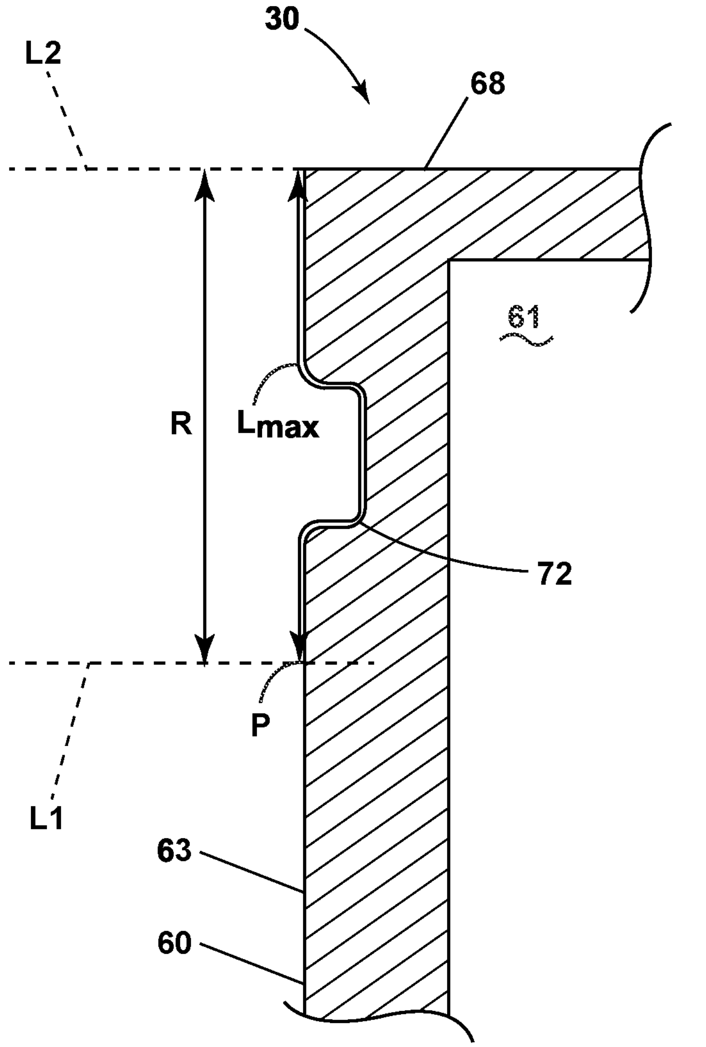
FIG. 4 is a schematic cross-sectional view illustrating a representation of a portion the tip for the turbine blade of FIG. 3 along line IV-IV.

Turning to FIG. 4, a schematic cross-sectional view of the blade 30 proximate the tip 68 along line IV-VI of FIG. 3 is shown. The pressure side 63 is illustrated along with a portion of the interior 61. In addition, an exemplary surface feature 72 is provided in the outer wall 60. The surface feature 72 is shown in the form of an indent or recess in the outer wall 60. It is also contemplated that the surface feature 72 can include, or alternatively take the form of a protrusion, such as a shelf, extending outwardly (right to left) from the outer wall 60. The surface feature 72 represents a deviation from a locally-flat outer wall 60. Such a deviation also includes surface textures, such as bumps, divots, surface roughness, or the like that may be present on the outer wall 60.

A surface length (denoted "$L_{max}$") is defined by a span-wise contour line along the outer wall 60 between the first location L1 and the second location L2, taken at the common chord-wise position P (FIG. 3) as described above. The surface length $L_{max}$ measures the span-wise length of the pressure side surface contour, taken along the outer wall 60 between L1 and L2, excluding any cooling holes, slots, or other apertures that extend through the outer wall 60 into the interior 61.

A radial length (denoted "R") is the radial distance between the first location L1 and the second location L2. The surface length $L_{max}$ and the radial length R along the span-wise direction S are non-orthogonal to the engine centerline 20 (FIG. 3) in some implementations. As can be understood from FIG. 4, $L_{max}$ is greater than R due to the presence of an indentation. Similarly, $L_{max}$ will be greater than R when there is a protrusion, instead of an indentation. The surface length ($L_{max}$) and radial length (R) are measured along the dashed line, which extends perpendicular to the line indicating the chord line C in FIG. 3.

The surface length $L_{max}$ and the radial length R are both defined at the common chord-wise position P. The first and second locations L1, L2 are illustrated in dashed line intersecting the outer wall 60, and the radial length R is indicated as being spaced from the surface length $L_{max}$. It will be understood that this is for visual clarity purposes only, and that both the surface length $L_{max}$ and the radial length R are defined at the common chord-wise position P. It can also be appreciated that the surface length $L_{max}$ is greater than the radial length R when the surface feature 72 is present in the outer wall 60.

Figure 5:
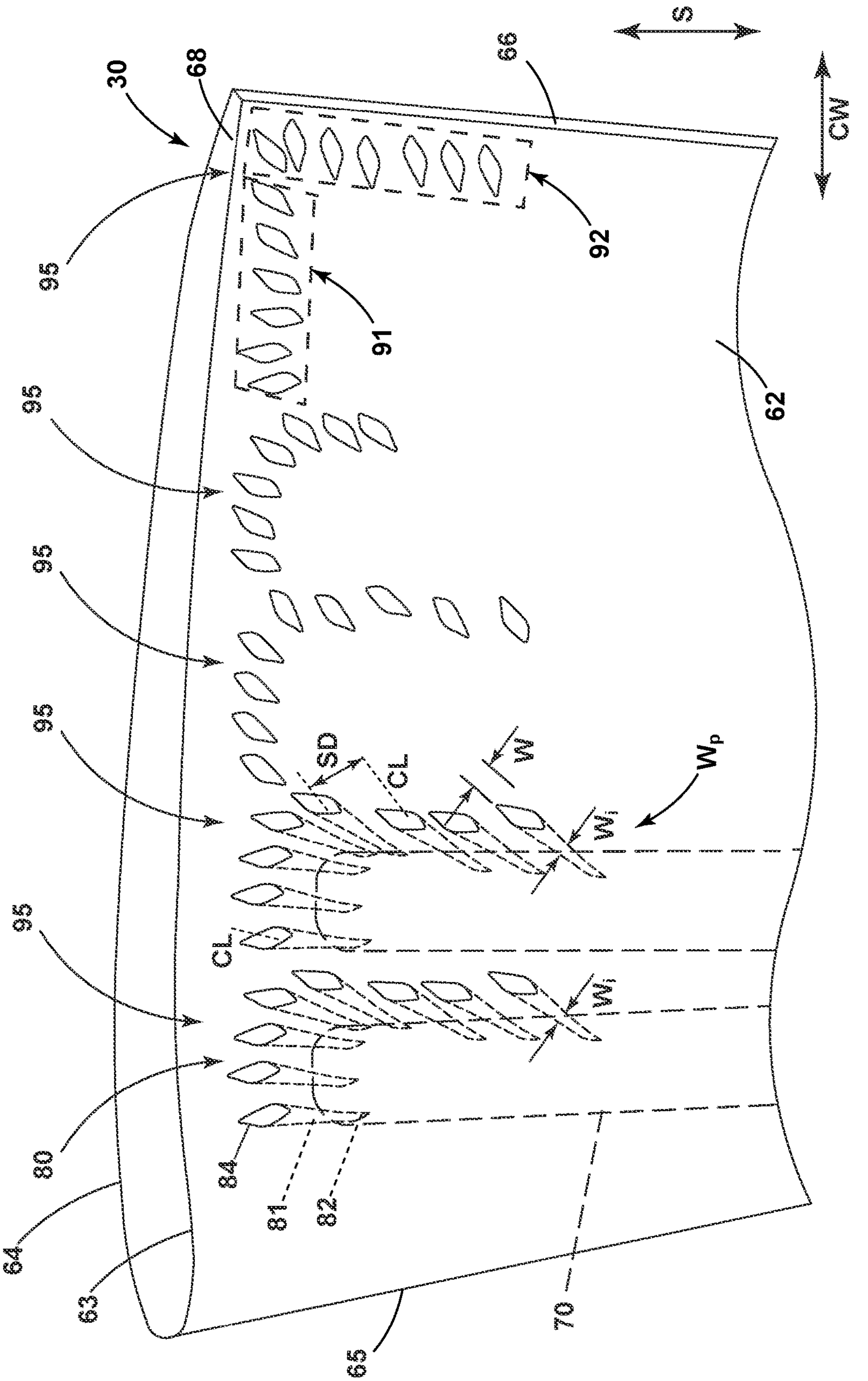
FIG. 5 is a perspective view of the turbine blade of FIG. 3 illustrating a plurality of cooling holes in accordance with various aspects described herein.

Referring now to FIG. 5, the blade 30 is illustrated with the plurality of film holes 80 in accordance with various aspects described herein. The plurality of film holes 80 includes a corresponding plurality of passages 81 extending between a corresponding plurality of inlets 82 and a corresponding plurality of outlets 84. The plurality of inlets 82 are fluidly coupled to the at least one cooling conduit 70. The plurality of outlets 84 are located on the exterior surface 62.

Each passage in the plurality of passages 81 defines a corresponding individual passage width (denoted "$W_i$") as shown. An average passage width (denoted "$W_p$") is the average of the individual passage widths $W_i$ for the plurality of passages 81. In cases where the individual passage width $W_i$ of an individual passage is variable along that passage, the average width of the individual passage $W_i$ is used. The average passage width $W_p$ of the plurality of passages is in a range between 5-20 mils (127-508 μm) in some examples.

In addition, the plurality of passages 81 define a corresponding plurality of centerlines (denoted "CL"). While the plurality of centerlines CL are schematically illustrated with dashed straight lines, it should be understood that the plurality of centerlines CL form midlines of the corresponding plurality of passages 81, including any curvatures that may be present.

In addition, a plurality of spacing distances (denoted "SD") are defined between corresponding centerlines CL of pairs of adjacent passages in the plurality of passages 81. It is contemplated that each spacing distance in the plurality of spacing distances SD can be between 1-7 times the average passage width $W_p$.

The plurality of outlets 84 includes a first subset of outlets 91 and a second subset of outlets 92. The first subset of outlets 91 extends at least partially along the chord-wise direction CW. The second subset of outlets 92 extends at least partially along the span-wise direction S. The second subset of outlets 92 also intersects the first subset of outlets 91.

The first subset of outlets 91 are positioned proximate the tip 68. In one example, the first subset of outlets 91 is spaced from the tip 68 between 0-10% of the span-wise length L (FIG. 3). Put another way, the first subset of outlets 91 is located between 0-10% span.

Each outlet in the plurality of outlets 84 can have any suitable shape, size, or geometric profile, including round, oval, elongated, asymmetric, or irregular. The plurality of outlets 84, including the first and second subsets of outlets 91, 92, can include identical or differing geometric profiles.

In the example shown, the first subset of outlets 91 and the second subset of outlets 92 define a pattern group of outlets 95. The pattern group of outlets 95 define a geometric profile including L-shaped, T-shaped, or the like. In the example shown, multiple, repeating pattern groups of outlets 95 are arranged chord-wise along the outer wall 60 to form multiple L-shaped geometric profiles. The multiple pattern groups of outlets 95 can have identical or differing numbers of outlets.

Figure 6:
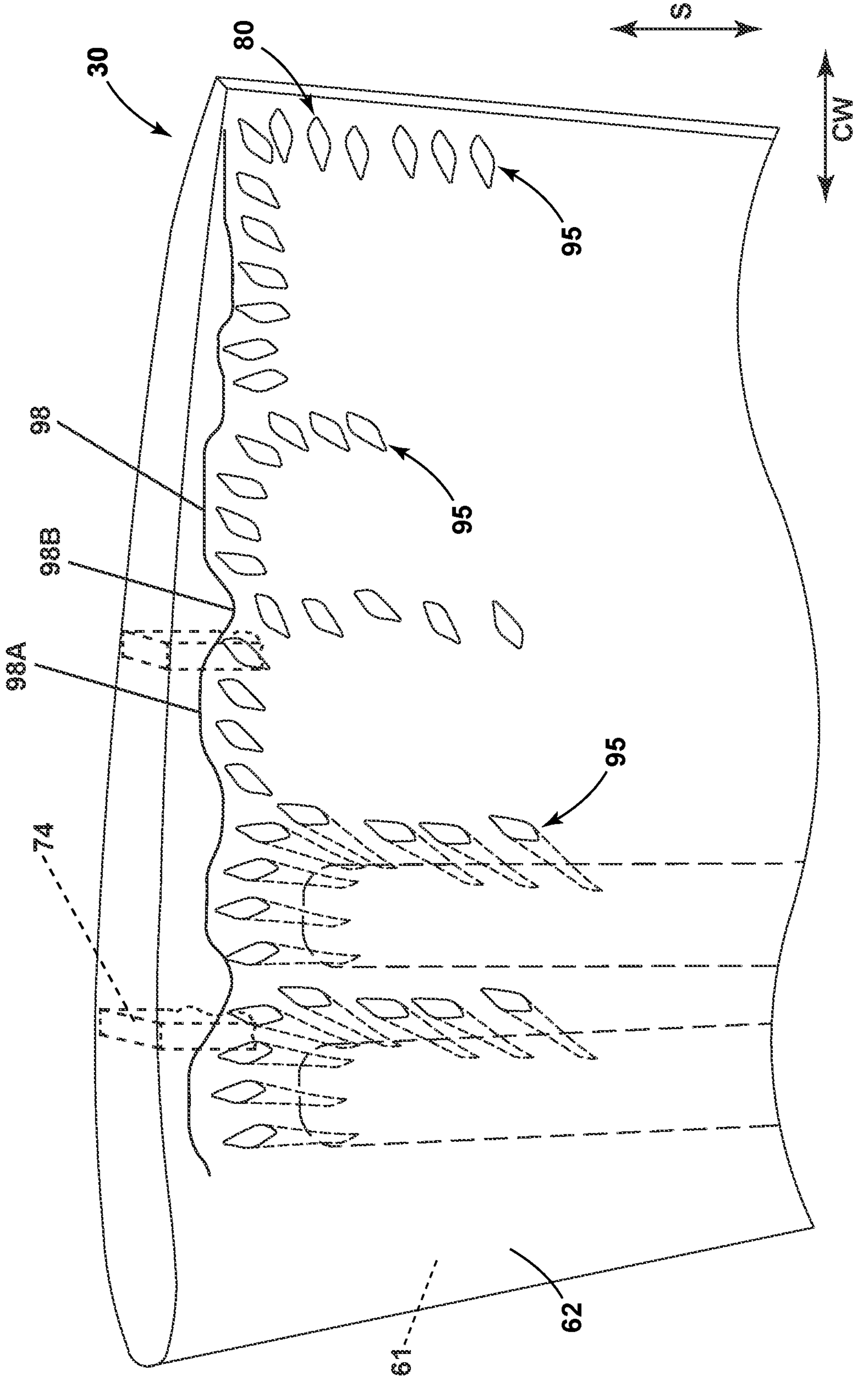
FIG. 6 is a perspective view of the turbine blade of FIG. 5 illustrating a geometric profile of the plurality of cooling holes.

Turning to FIG. 6, it is contemplated that the pattern groups of outlets 95 collectively form an undulating geometric profile 98 (or "profile 98"). The profile 98 includes at least a span-wise peak 98A and at least a span-wise valley 98B. In the example shown, the profile 98 includes multiple alternating span-wise peaks 98A and span-wise valleys 98B. The profile 98 can also include other geometric features or shapes including smooth portions, discontinuous portions, flat portions, or the like, or combinations thereof.

The profile 98 also has a predetermined position along the exterior surface 62 with respect to interior components of the blade 30. In the example shown, some exemplary dividing ribs 74 are schematically illustrated within the interior 61 of the blade 30. The dividing ribs 74 separate or divide internal passages, such as the at least one cooling conduit 70. The dividing ribs 74 can also be structural supports, such as for internal rigidity during rotation of the blade 30. It is contemplated that the profile 98 can be arranged such that each span-wise valley 98B is downstream of the corresponding dividing rib 74. For example, the span-wise valley 98B provides additional span-wise cooling in regions downstream of the dividing ribs 74 due to the locally-increased thermal mass or temperature profile in those regions.

With general reference to FIGS. 1-5, during operation, cooling air flowing through each pattern group of outlets 95 is directed onto the exterior surface 62. Chord-wise or axial film cooling near the tip 68 is provided by the first subset of outlets 91 in each pattern group of outlets 95. The axial film cooling transitions to span-wise film cooling further down the blade 30, as provided by the second subset of outlets 92 in each pattern group of outlets 95. The undulating geometric profile 98 collectively formed by the multiple, repeating pattern groups of outlets 95 spreads cooling film over local portions of the blade 30 needing additional cooling, such as adjacent the dividing ribs 74.

As described earlier, finding a workable solution to the nozzle-exit problem involves finding the balance between effective cooling and aerodynamic performance by way of the cooling holes and blade geometry described herein. This is a labor- and time-intensive process. Because the process is iterative and involves the selection of various cooling hole layouts designed for (in one example) flight idle, and then evaluating whether at other times in flight (e.g. non-flight idle) the cooling hole layout provides acceptable cooling for the blade. In some examples, the blade may have a different pressure-side smoothness compared to a baseline pressure-side smoothness on which the cooling hole layout was designed. Put another way, the cooling hole layout was often selected accordingly for various blade configurations before a cooling hole layout was found that satisfies all design requirements, e.g. cooling performance, aerodynamic performance, pressure ratio, rigidity, durability, thermal stresses, noise transmission levels, or the like.

Table 1 below illustrates some cooling hole configurations that yielded workable solutions to the nozzle-exit wake problem.

TABLE 1

| Example: | 1 | 2 | 3 | 4 | 5 | 6 | 7 | 8 |
|---|---|---|---|---|---|---|---|---|
| TR (in) | 15.25 | 15.45 | 15.50 | 15.60 | 15.30 | 15.65 | 15.70 | 15.75 |
| EGT (° C.) | 1090 | 1090 | 990 | 1020 | 1080 | 1070 | 1000 | 990 |
| NB | 60 | 60 | 64 | 62 | 62 | 60 | 64 | 64 |
| NN | 42 | 42 | 38 | 40 | 42 | 40 | 38 | 38 |
| $L_{max}$ (in) | 0.205 | 0.205 | 0.253 | 0.219 | 0.224 | 0.245 | 0.235 | 0.253 |
| R (in) | 0.205 | 0.205 | 0.205 | 0.210 | 0.218 | 0.217 | 0.220 | 0.205 |

It was discovered, unexpectedly, during the course of engine design and the time-consuming iterative process previously described, that a relationship exists between the number of blades NB per stage, the number of nozzles NN per stage, the tip radius TR, the exhaust gas temperature EGT, and the blade parameter BP that yielded improved results. Improved results were found when a degree of flatness (represented by BP) and cooling hole distribution was tied to the number of blades NB per stage, the number of nozzles NN per stage, the tip radius TR, and the exhaust gas temperature EGT. Whereas a cooling hole pattern and degree of flatness may provide a desired result for one engine configuration, that same combination would not necessarily provide the desired result for another engine configuration. The inventors found that an improved blade performance was found not simply based on experiments of the blade subjected to aerodynamic, thermal, and dynamic environments generally applicable to a variety of engine configurations. Rather, a better blade design is found when blade properties (flatness, e.g., FIG. 4, and cooling hole distribution, e.g., FIGS. 5-6) are made dependent to the specific environment created by the engine to which the blade is installed, which environment is represented by NB, NN, TR and EGT.

Such a relationship can narrow the vast range of possible blade designs down to a range providing working solutions with a desired degree of thermal efficiency for the specific engine configuration. After conducting numerous cycle tests during transient conditions (e.g., take-off and approach), it was found that reducing a blade surface contour (e.g. reducing a tip shelf contour), in combination with a repeating pattern of cooling holes relative to a flat surface (where the blade parameter BP is greater than or equal to 1) at the 0-10% span location on the blade, results in a highly useful and desirable blade with respect to cooling performance, aerodynamic performance, durability, and cycle life for the blade for particular engine configurations.

Moreover, by utilizing this relationship, the inventors found that the number of suitable or feasible blades to be placed in a turbine engine that are capable of meeting the design requirements could be greatly reduced, thereby facilitating a more rapid down-selection of blade designs to consider as an engine is being developed. Such benefit provides more insight to the requirements for a given engine, and to the requirements for particular component locations within the engine, long before specific technologies, integration, or system requirements are developed fully. The discovered relationship also avoids or prevents late-stage redesign while also providing a blade design that integrates both efficient performance and cooling effectiveness.

The desired relationship is represented by a blade tip durability factor (denoted "BTDF"):

$$BTDF = \left(\frac{TR}{EGT}\right) \times \left(\frac{NB}{NN}\right) \times BP \quad (1)$$

where TR is the tip radius, EGT is the exhaust gas temperature, NB is the number of blades 30 per stage, NN is the number of nozzles 38 per stage, and BP is the blade parameter:

$$BP = \frac{L_{max}}{R} \quad (2)$$

wherein the surface length $L_{max}$ is measured as a contour line along the outer wall 60 between the first and second locations L1, L2, including any local surface curvatures, and wherein the radial length R is measured along the span-wise line between the first and second locations L1, L2 at the same or common chord-wise position as the surface length $L_{max}$. The blade parameter BP is greater than 1 when the ratio of $L_{max}$/R is greater than 1 at a given chord-wise position. As described above, the blade parameter BP is greater than 1 when either a surface indent/recess or a surface protrusion is present on the outer wall 60. Minimum and maximum values for blade and engine characteristics, respectively, where expressions (1) and (2) apply and are consistent with the teachings in this disclosure, are provided in Table 2:

TABLE 2

| Parameter | Minimum Value | Maximum Value |
|---|---|---|
| TR (in) | 15.25 | 15.75 |
| EGT (° C.) | 990 | 1090 |
| NB | 60 | 64 |
| NN | 38 | 42 |
| $L_{max}$ (in) | 0.205 | 0.253 |
| R (in) | 0.205 | 0.224 |
| BP | 1.000 | 1.234 |
| BTDF (in/° C.) | 0.020 | 0.033 |

BP and BTDF values corresponding to Examples 1-8 in Table 1 are provided below in Table 3.

TABLE 3

| Example: | 1 | 2 | 3 | 4 | 5 | 6 | 7 | 8 |
|---|---|---|---|---|---|---|---|---|
| BP | 1.000 | 1.000 | 1.234 | 1.043 | 1.028 | 1.129 | 1.068 | 1.234 |
| BTDF | 0.020 | 0.020 | 0.033 | 0.025 | 0.021 | 0.025 | 0.028 | 0.033 |

It was found that the range of values for BP and BTDF in Table 2 above correlate to a generally flat blade surface without surface features 72 (FIG. 3) while still providing desired blade cooling and performance. A blade parameter BP of 1 corresponds to a perfectly flat blade outer wall, where $R=L_{max}$ as described above. Surface protrusions or recesses, e.g. a shelf or pocket, causes $L_{max}$ to be larger than R by more than 10% and introduces a need for redesigned cooling mechanisms for the extra surface area. The range for BP between 1-1.234 as described in Table 2 above allows for the blade outer wall to have an overall smooth blade surface with minor surface roughness or textures present while still preserving desired cooling and performance.

In addition, it was found that a narrowed design range for the tip radius TR being within 15.45-15.50 inches, as shown in Examples 2-3 in Table 1 above, provided for desirable blade cooling and performance, while the resulting narrowed minimum and maximum BTDF values did not differ by more than 2% from the values in Table 2 above.

Additional benefits associated with the BTDF described herein include a quick assessment of design parameters in terms of blade size, engine temperature, and blade and vane numbers for engine design and particular blade design. While narrowing these multiple factors to a region of possibilities saves time, money, and resources, the BTDF described herein enables the development and production of high-performance turbine engines and blades across multiple performance metrics within a given set of constraints.

Benefits associated with the cooling holes described herein include a transition between axial film cooling and span-wise film cooling in each pattern group of outlets, providing for a spread of cooling film along desired tip regions of the blade. The undulating geometric profile collectively formed by the multiple, repeating pattern groups of outlets additionally spreads cooling film over local portions of the blade needing additional cooling.

To the extent one or more structures provided herein can be known in the art, it should be appreciated that the present disclosure can include combinations of structures not previously known to combine, at least for reasons based in part on conflicting benefits versus losses, desired modes of operation, or other forms of teaching away in the art.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

A turbine engine, comprising: an engine core extending along an engine centerline and including a compressor section, a combustor, and a turbine section in serial flow arrangement; a temperature sensor within the engine and configured to detect an exhaust gas temperature (EGT) within the engine core; a set of nozzles circumferentially arranged in the turbine section and defining a number of nozzles (NN); and a set of blades circumferentially arranged in the turbine section adjacent to, and downstream of, the set of nozzles, with the set of blades defining a number of blades (NB); wherein a blade in the set of blades comprises: an outer wall bounding an interior and having an exterior surface, with the outer wall defining a pressure side and a suction side and extending between a leading edge and a trailing edge to define a chord-wise direction, and also extending between a root and a tip to define a span-wise direction; a cooling conduit within the interior; a plurality of film holes comprising a corresponding plurality of passages extending between a corresponding plurality of inlets and a corresponding plurality of outlets, with the plurality of inlets fluidly coupled to the cooling conduit and the plurality of outlets located on the exterior surface, wherein the plurality of outlets comprises a first subset of outlets at least partially extending along the chord-wise direction proximate the tip, and also comprises a second subset of outlets extending at least partially along the span-wise direction and intersecting the first subset of outlets; a tip radius (TR) defined between the engine centerline and the tip under standard day conditions of 15° C. at mean sea level altitude and 101.3 kPa atmospheric pressure; a radial length (R) defined by a span-wise line extending between a first location on the outer wall and a second location on the outer wall, with the first location and the second location having a common chord-wise position; a surface length ($L_{max}$) defined by a contour line along the outer wall between the first location and the second location at the common chord-wise position; and a blade parameter (BP) defined as a ratio of the surface length to the radial length ($BP=L_{max}/R$); wherein the exhaust gas temperature EGT, the number of blades NB, the number of nozzles NN, the tip radius TR, and the blade parameter BP define a blade tip durability factor (BTDF) by the following expression:

$$BTDF=\left(\frac{TR}{EGT}\right)\times\left(\frac{NB}{NN}\right)\times BP;$$

wherein the blade tip durability factor BTDF is between 0.020-0.033 in/° C., and the blade parameter BP is between 1-1.234.

The turbine engine of any preceding clause, wherein the first subset of outlets and the second subset of outlets define a pattern group of outlets.

The turbine engine of any preceding clause, further comprising multiple pattern groups of outlets arranged chord-wise along the outer wall.

The turbine engine of any preceding clause, wherein the multiple pattern groups of outlets comprise multiple L-shaped geometric profiles.

The turbine engine of any preceding clause, wherein the multiple pattern groups of outlets collectively form an undulating geometric profile on the exterior surface having at least a span-wise peak and at least a span-wise valley.

The turbine engine of any preceding clause, further comprising a dividing rib located within the interior.

The turbine engine of any preceding clause, wherein the span-wise valley is located downstream of the dividing rib.

The turbine engine of any preceding clause, further comprising a span-wise length defined along the outer wall from the tip to the root, wherein the first subset of outlets is spaced from the tip between 0-10% of the span-wise length.

The turbine engine of any preceding clause, further comprising: an average passage width defined for the plurality of passages; and a plurality of spacing distances defined between corresponding pairs of adjacent passages in the plurality of passages; wherein each spacing distance in the plurality of spacing distances is between 1-7 times the average passage width.

The turbine engine of any preceding clause, wherein the number of blades NB is between 60 and 64.

The turbine engine of any preceding clause, wherein the number of nozzles NN is between 38 and 42.

The turbine engine of any preceding clause, wherein the exhaust gas temperature EGT is between 990° C. and 1090° C.

The turbine engine of any preceding clause, wherein the tip radius TR is between 15.25 and 15.75 in.

The turbine engine of any preceding clause, wherein the tip radius TR is between 15.45 and 15.50 in.

The turbine engine of any preceding clause, wherein the surface length $L_{max}$ is between 0.205-0.253.

The turbine engine of any preceding clause, wherein the radial length R is between 0.205-0.224.

A turbine engine, comprising: an engine core including a compressor section, a combustor, and a turbine section in serial flow arrangement, with at least one of the compressor section or the turbine section having an airfoil comprising: an outer wall bounding an interior and having an exterior surface, with the outer wall defining a pressure side and a suction side and extending between a leading edge and a trailing edge to define a chord-wise direction, and also extending between a root and a tip to define a span-wise direction, with the tip forming a radially outermost surface of the outer wall; a cooling conduit within the interior; and a plurality of film holes comprising a corresponding plurality of passages extending between a corresponding plurality of inlets and a corresponding plurality of outlets, with the plurality of inlets fluidly coupled to the cooling conduit and the plurality of outlets located on the exterior surface; wherein the plurality of outlets comprises a first subset of outlets at least partially extending along the chord-wise direction proximate the tip, and also comprises a second subset of outlets extending at least partially along the span-wise direction and intersecting the first subset of outlets.

The turbine engine of any preceding clause, wherein the first subset of outlets and the second subset of outlets define a pattern group of outlets.

The turbine engine of any preceding clause, further comprising multiple pattern groups of outlets arranged along the outer wall, the multiple pattern groups of outlets comprising multiple L-shaped geometric profiles spaced chord-wise along the outer wall.

The turbine engine of any preceding clause, further comprising a span-wise length defined along the outer wall from the tip to the root, wherein the first subset of outlets is spaced from the tip between 0-10% of the span-wise length.

The turbine engine of any preceding clause, further comprising: an average passage width defined for the plurality of passages; and a plurality of spacing distances defined between corresponding pairs of adjacent passages in the plurality of passages; wherein each spacing distance in the plurality of spacing distances is between 1-7 times the average passage width.

A turbine engine, comprising: an engine core extending along an engine centerline and including a compressor section, a combustor, and a turbine section in serial flow arrangement; a temperature sensor within the engine and configured to detect an exhaust gas temperature (EGT) within the engine core; a set of nozzles circumferentially arranged in the turbine section and defining a number of nozzles (NN); and a set of blades circumferentially arranged in the turbine section adjacent to, and downstream of, the set of nozzles, with the set of blades defining a number of blades (NB); wherein a blade in the set of blades comprises: an outer wall bounding an interior, with the outer wall defining a pressure side and a suction side and extending between a leading edge and a trailing edge to define a chord-wise direction, and also extending between a root and a tip to define a span-wise direction; a tip radius (TR) defined between the engine centerline and the tip under standard day conditions of 15° C. at mean sea level altitude and 101.3 kPa atmospheric pressure; a radial length (R) defined by a span-wise line extending between a first location on the outer wall and a second location on the outer wall, with the first location and the second location having a common chord-wise position; a surface length ($L_{max}$) defined by a contour line along the outer wall between the first location and the second location at the common chord-wise position; and a blade parameter (BP) defined as a ratio of the surface length to the radial length ($BP=L_{max}/R$); wherein the exhaust gas temperature EGT, the number of blades NB, the number of nozzles NN, the tip radius TR, and the blade parameter BP define a blade tip durability factor (BTDF) by the following expression:

$$BTDF = \left(\frac{TR}{EGT}\right) \times \left(\frac{NB}{NN}\right) \times BP;$$

wherein the blade tip durability factor BTDF is between 0.020-0.033 in/° C., and the blade parameter BP is between 1-1.234.

The turbine engine of any preceding clause, wherein the first location is spaced from the tip by 0-10% of a span-wise length defined between the root and the tip, and wherein the second location is at the tip.

The turbine engine of any preceding clause, wherein the number of blades NB is between 60 and 64.

The turbine engine of any preceding clause, wherein the number of nozzles NN is between 38 and 42.

The turbine engine of any preceding clause, wherein the exhaust gas temperature EGT is between 990° C. and 1090° C.

The turbine engine of any preceding clause, wherein the tip radius TR is between 15.25 and 15.75 in.

The turbine engine of any preceding clause, wherein the tip radius TR is between 15.45 and 15.50 in.

The turbine engine of any preceding clause, wherein the surface length $L_{max}$ is between 0.205-0.253.

The turbine engine of any preceding clause, wherein the radial length R is between 0.205-0.224.

A turbine blade for use in a turbine engine core extending along an engine centerline and including a compressor section, a combustor, and a turbine section in serial flow arrangement, the engine being characterized by an exhaust gas temperature (EGT), and a set of nozzles (NN), wherein the engine receives NB of the turbine blade, the turbine blade comprising: an outer wall bounding an interior and having an exterior surface, with the outer wall defining a pressure side and a suction side and extending between a leading edge and a trailing edge to define a chord-wise direction, and also extending between a tip and a root to define a span-wise direction; a cooling conduit within the interior; a plurality of film holes comprising a corresponding plurality of passages extending between a corresponding plurality of inlets and a corresponding plurality of outlets, with the plurality of inlets fluidly coupled to the cooling conduit and the plurality of outlets located on the exterior surface, wherein the plurality of outlets comprises a first subset of outlets at least partially extending along the chord-wise direction proximate the tip, and also comprises a second subset of outlets extending at least partially along the span-wise direction and intersecting the first subset of outlets; a tip radius (TR) defined between the tip and the root under standard day conditions of 15° C. at mean sea level altitude and 101.3 kPa atmospheric pressure; a radial length (R) defined by a span-wise line extending between a first location on the outer wall and a second location on the outer wall, with the first location and the second location having a common chord-wise position; a surface length ($L_{max}$) defined by a contour line along the outer wall between the first location and the second location at the common chord-wise position; and a blade parameter (BP) defined as a ratio of the surface length to the radial length ($BP=L_{max}/R$); wherein the exhaust gas temperature EGT, the number of blades NB, the number of nozzles NN, the tip radius TR, and the blade parameter BP define a blade tip durability factor (BTDF) by the following expression:

$$BTDF = \left(\frac{TR}{EGT}\right) \times \left(\frac{NB}{NN}\right) \times BP;$$

wherein the blade tip durability factor BTDF is between 0.020-0.033 in/° C., and wherein the blade parameter BP is between 1-1.234.

What is claimed is:

1. A turbine engine, comprising:

an engine core extending along an engine centerline and including a compressor section, a combustor, and a turbine section in serial flow arrangement;

a temperature sensor within the turbine engine and configured to detect an exhaust gas temperature (EGT) within the engine core;

a set of nozzles circumferentially arranged in the turbine section and defining a number of nozzles (NN); and a set of blades circumferentially arranged in the turbine section adjacent to, and downstream of, the set of nozzles, with the set of blades defining a number of blades (NB);

wherein a blade in the set of blades comprises:

an outer wall bounding an interior and having an exterior surface, with the outer wall defining a pressure side and a suction side and extending between a leading edge and a trailing edge to define a chord-wise direction, the outer wall also extending between a tip and a root to define a span-wise direction;

a cooling conduit within the interior;

a plurality of film holes comprising a corresponding plurality of passages extending between a corresponding plurality of inlets and a corresponding plurality of outlets, with the plurality of inlets fluidly coupled to the cooling conduit and the plurality of outlets located on the exterior surface, wherein the plurality of outlets comprises a first subset of outlets at least partially extending along the chord-wise direction proximate the tip, the plurality of outlets further comprising a second subset of outlets extending at least partially along the span-wise direction and intersecting the first subset of outlets;

a tip radius (TR) defined between the engine centerline and the tip under standard day conditions of 15° C. at mean sea level altitude and 101.3 kPa atmospheric pressure;

a radial length (R) defined by a span-wise line extending between a first location on the outer wall and a second location on the outer wall, with the first location and the second location sharing a common chord-wise position;

a surface length ($L_{max}$) defined by a contour line along the outer wall between the first location and the second location at the common chord-wise position; and a blade parameter (BP) defined as a ratio of the surface length to the radial length (BP=L_max/(R);)

wherein the engine exhaust gas temperature EGT, the number of blades NB, the number of nozzles NN, the tip radius TR, and the blade parameter BP define a blade tip durability factor (BTDF) as:

$$BTDF = \left(\frac{TR}{EGT}\right) \times \left(\frac{NB}{NN}\right) \times BP;$$

wherein the blade tip durability factor BTDF is between 0.020-0.033 in/° C., and the blade parameter BP is between 1-1.234.

2. The turbine engine of claim 1, wherein the first subset of outlets and the second subset of outlets define a pattern group of outlets.

3. The turbine engine of claim 2, further comprising multiple pattern groups of outlets arranged chord-wise along the outer wall.

4. The turbine engine of claim 3, wherein the multiple pattern groups of outlets comprise multiple L-shaped geometric profiles.

5. The turbine engine of claim 3, wherein the multiple pattern groups of outlets collectively form an undulating geometric profile on the exterior surface having at least a span-wise peak and at least a span-wise valley.

6. The turbine engine of claim 5, further comprising a dividing rib located within the interior, wherein the span-wise valley is located downstream of the dividing rib.

7. The turbine engine of claim 1, further comprising a span-wise length defined along the outer wall from the tip to the root, wherein the first subset of outlets is spaced from the tip between 0-10% of the span-wise length.

8. The turbine engine of claim 1, further comprising:

an average passage width defined for the plurality of passages; and a plurality of spacing distances defined between corresponding pairs of adjacent passages in the plurality of passages;

wherein each spacing distance in the plurality of spacing distances is between 1-7 times the average passage width.

9. The turbine engine of claim 1, wherein the number of blades NB is between 60 and 64, and wherein the number of nozzles NN is between 38 and 42.

10. The turbine engine of claim 1, wherein the exhaust gas temperature EGT is between 990° C. and 1090° C., the tip radius TR is between 15.25 and 15.75 in, the surface length $L_{max}$ is between 0.205-0.253 in, and the radial length R is between 0.205-0.224 in.

11. A turbine engine core, comprising:

a compressor section, a combustor, and a turbine section in serial flow arrangement, wherein at least one of the compressor section or the turbine section having includes an airfoil comprising:

an outer wall bounding an interior and having an exterior surface, with the outer wall defining a pressure side and a suction side and extending between a leading edge and a trailing edge to define a chord-wise direction, and also extending between a tip and a root to define a span-wise direction, with the tip forming a radially outermost surface of the outer wall;

a cooling conduit within the interior; and a plurality of film holes comprising a corresponding plurality of passages extending between a corresponding plurality of inlets and a corresponding plurality of outlets, with the plurality of inlets fluidly coupled to the cooling conduit and the plurality of outlets located on the exterior surface;

wherein the plurality of outlets comprises a first subset of outlets at least partially extending along the chord-wise direction proximate the tip, and also comprises a second subset of outlets extending at least partially along the span-wise direction and intersecting the first subset of outlets.

12. The turbine engine core of claim 11, wherein the first subset of outlets and the second subset of outlets define a pattern group of outlets.

13. The turbine engine core of claim 12, further comprising multiple pattern groups of outlets arranged along the outer wall, the multiple pattern groups of outlets comprising multiple L-shaped geometric profiles spaced chord-wise along the outer wall.

14. The turbine engine core of claim 11, further comprising a span-wise length defined along the outer wall from the tip to the root, wherein the first subset of outlets is spaced from the tip between 0-10% of the span-wise length.

15. The turbine engine core of claim 11, further comprising:

an average passage width defined for the plurality of passages; and a plurality of spacing distances defined between corresponding pairs of adjacent passages in the plurality of passages;

wherein each spacing distance in the plurality of spacing distances is between 1-7 times the average passage width.

16. A turbine engine, comprising:

an engine core extending along an engine centerline and including a compressor section, a combustor, and a turbine section in serial flow arrangement;

a temperature sensor within the turbine engine and configured to detect an exhaust gas temperature (EGT) within the engine core;

a set of nozzles circumferentially arranged in the turbine section and defining a number of nozzles (NN); and a set of blades circumferentially arranged in the turbine section adjacent to, and downstream of, the set of nozzles, with the set of blades defining a number of blades (NB);

wherein a blade in the set of blades comprises:

an outer wall bounding an interior, with the outer wall defining a pressure side and a suction side and extending between a leading edge and a trailing edge to define a chord-wise direction, the outer wall and also extending between a tip and a root to define a span-wise direction;

a tip radius (TR) defined between the root and the tip under standard day conditions of 15° C. at mean sea level altitude and 101.3 kPa atmospheric pressure;

a radial length (R) defined by a span-wise line extending between a first location on the outer wall and a second location on the outer wall, with the first location and the second location sharing a common chord-wise position;

a surface length ($L_{max}$) defined by a contour line along the outer wall between the first location and the second location at the common chord-wise position; and a blade parameter (BP) defined as a ratio of the surface length to the radial length (BP=L_max/R);

wherein the engine exhaust gas temperature EGT, the number of blades NB, the number of nozzles NN, the tip radius TR, and the blade parameter BP define a blade tip durability factor (BTDF) by:

$$BTDF = \left(\frac{TR}{EGT}\right) \times \left(\frac{NB}{NN}\right) \times BP;$$

wherein the blade tip durability factor BTDF is between 0.020-0.033 in/° C., and wherein the blade parameter BP is between 1-1.234.

17. The turbine engine of claim 16, wherein the first location is spaced from the tip by 0-10% of a span-wise length defined between the tip and the root, and wherein the second location is at the tip.

18. The turbine engine of claim 16, wherein the number of blades NB is between 60 and 64, and wherein the number of nozzles NN is between 38 and 42.

19. The turbine engine of claim 16, wherein the exhaust gas temperature EGT is between 990° C. and 1090° C.

20. The turbine engine of claim 16, wherein the tip radius TR is between 15.25 and 15.75 in, the surface length $L_{max}$ is between 0.205-0.253 in, and the radial length R is between 0.205-0.224 in.

* * * * *